(12) United States Patent
Nakagawa et al.

(10) Patent No.: US 8,665,140 B2
(45) Date of Patent: Mar. 4, 2014

(54) METHOD AND DEVICE FOR PROCESSING SIGNAL, AND RADAR DEVICE

(75) Inventors: Kazuya Nakagawa, Nishinomiya (JP); Hitoshi Maeno, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 350 days.

(21) Appl. No.: 13/293,219

(22) Filed: Nov. 10, 2011

(65) Prior Publication Data

US 2012/0127023 A1 May 24, 2012

(30) Foreign Application Priority Data

Nov. 19, 2010 (JP) ................................. 2010-259367

(51) Int. Cl.
*G01S 13/42* (2006.01)
*G01S 7/292* (2006.01)

(52) U.S. Cl.
CPC .............. *G01S 13/42* (2013.01); *G01S 7/2927* (2013.01)
USPC ............. 342/146; 342/91; 342/185; 342/195; 342/133; 342/139

(58) Field of Classification Search
CPC ......... G01S 7/16; G01S 7/2927; G01S 13/72; G01S 7/298; G01S 13/42; G01S 13/584
USPC ........... 342/146, 91, 107, 113, 133, 139–140, 342/185, 195
See application file for complete search history.

(56) References Cited

U.S. PATENT DOCUMENTS

| | | | |
|---|---|---|---|
| 4,649,390 A * | 3/1987 | Andrews et al. | 342/140 |
| 7,675,457 B2 * | 3/2010 | Nakanishi | 342/133 |
| 8,405,544 B2 * | 3/2013 | Nakagawa et al. | 342/146 |
| 8,487,810 B2 * | 7/2013 | Grau Besoli et al. | 342/134 |
| 2003/0058160 A1 | 3/2003 | Kitabatake et al. | |
| 2005/0156780 A1 * | 7/2005 | Bonthron et al. | 342/107 |
| 2011/0102248 A1 * | 5/2011 | Maeno et al. | 342/179 |
| 2011/0187579 A1 * | 8/2011 | Asada et al. | 342/27 |
| 2011/0241933 A1 * | 10/2011 | Nishiyama et al. | 342/179 |
| 2011/0298651 A1 * | 12/2011 | Nakagawa et al. | 342/146 |
| 2012/0007767 A1 * | 1/2012 | Maeno | 342/92 |
| 2012/0127023 A1 * | 5/2012 | Nakagawa et al. | 342/146 |
| 2013/0002473 A1 * | 1/2013 | Pace et al. | 342/146 |

FOREIGN PATENT DOCUMENTS

| | | | | | |
|---|---|---|---|---|---|
| JP | 01123181 A | * | 5/1989 | | G01S 13/60 |
| JP | 02057993 A | * | 2/1990 | | G01S 7/32 |
| JP | 2003-87099 A | | 3/2003 | | |
| WO | WO 02/12915 A1 | | 2/2002 | | |

* cited by examiner

*Primary Examiner* — John B Sotomayor (74) *Attorney, Agent, or Firm* — Birch, Stewart, Kolasch & Birch, LLP (57) ABSTRACT

This disclosure provides a signal processing device, which includes an echo signal input unit for being inputted with echo signals caused by electromagnetic waves discharged from an antenna and reflected on one or more target objects, an echo signal level detector for detecting a level of each of the echo signals with reference to an azimuth and a distance to the antenna, a level change detector for detecting a level change between the echo signals from locations close to each other, the locations of the echo signals being such that the distances from the antenna are substantially the same but the azimuths are different, a pattern output module for comparing the level change with a predetermined reference pattern and outputting a level change pattern, and a missing determining module for determining a missing of a signal based on at least two of the level change patterns.

20 Claims, 12 Drawing Sheets

ECHO IMAGE
INCLUDING MISSING

FIG. 5A

ECHO IMAGE
AFTER INTERFERENCE
REMOVAL PROCESSING

FIG. 5B

ECHO IMAGE AFTER
MISSING REMOVAL AND
INTERFERENCE REMOVAL
PROCESSINGS OF THIS
EMBODIMENT

METHOD AND DEVICE FOR PROCESSING SIGNAL, AND RADAR DEVICE

CROSS-REFERENCE TO RELATED APPLICATION(S)

The application claims priority under 35 U.S.C. §119 to Japanese Patent Application No. 2010-259367, which was filed on Nov. 19, 2010, the entire disclosure of which is hereby incorporated by reference.

TECHNICAL FIELD

The present invention relates to a signal processing device and method for performing various kinds of processings on an echo signal, and also relates to a radar device equipped with the signal processing device.

BACKGROUND OF THE INVENTION

An electromagnetic wave discharge source (magnetron) of a radar device is sometimes, although rarely, unable to discharge a pulse with a desired energy, thereby resulting in a missing phenomenon (JP2003-087099A).

Currently, the frequency of occurrence of the missing has been generally controlled by hardware improvement, such as magnetron improvement.

However, even by hardware improvement, the probability of the missing occurrence cannot be reduced to 0%.

SUMMARY OF THE INVENTION

Thus, the present invention is made in view of the above situation, and provides a signal processing device in which measures against missing of a signal is achieved by signal processing.

According to an aspect of the invention, a signal processing device is provided, which includes an echo signal input unit for being inputted with echo signals caused by electromagnetic waves discharged from an antenna and reflected on one or more target objects, an echo signal level detector for detecting a level of each of the echo signals with reference to an azimuth and a distance to the antenna, a level change detector for detecting a level change between the echo signals from locations close to each other, the locations of the echo signals being such that the distances from the antenna are substantially the same but the azimuths are different, a pattern output module for comparing the level change with a predetermined reference pattern and outputting a level change pattern, and a missing determining module for determining a missing of a signal based on at least two of the level change patterns.

Thereby, the level change pattern peculiar to a missing of a signal in which its level sharply rises after sharply falling in an azimuth direction can be extracted. When the missing is determined, an observing sample is interpolated by data adjacent thereto in the azimuth direction, for example. Thereby, a removal of the missing by the signal processing can be achieved.

The locations corresponding to the echo signals used for outputting the at least two level change patterns may be adjacent to each other.

The pattern output module may classify the level change into a first pattern if the level change is less than a first threshold, into a second pattern if the level change exceeds a second threshold, and into a third pattern if the level change applies to neither the first pattern nor the second pattern.

The missing determining module may determine the missing when the pattern of the level change changes from the first pattern to the second pattern.

The missing determining module may determine the missing when the pattern of the level change changes from the first pattern to the third pattern.

The missing determining module may determine the missing when the pattern of the level change changes from the third pattern to the second pattern.

The level change may correspond to a difference value of the levels of the echo signals adjacent to each other in the azimuth direction.

The missing determining module may determine the missing in either one of cases where the third pattern follows the first pattern and where a group of at least two consecutive third patterns follows the first pattern.

The missing determining module may determine the missing in either one of cases where the second pattern follows a group of at least two consecutive third patterns and where the second pattern follows the third pattern.

The missing determining module may determine the missing in a case where at least two first patterns appear consecutively.

The missing determining module may determine the missing in a case where at least two second patterns appear consecutively.

The level change detector may average the level changes in the distance direction, and the pattern output module may use the averaged level change for the comparison.

The level change detector may further detect a level change between the echo signals from locations which are close to each other, the locations of the echo signals being such that the azimuths from the antenna are substantially the same but the distances from the antenna are different. The pattern output module may output the most frequent level change pattern within a predetermined distance range as the level change pattern for every azimuth and distance.

The level change detector may further detect a level change between the echo signals from locations which are close to each other, the locations of the echo signals being such that the azimuths from the antenna are substantially the same but the distances from the antenna are different. The missing determining module may determine the missing further based on a plurality of level change patterns adjacent to each other in the distance direction.

The signal processing device may further include an echo signal level controller for controlling the level of the echo signal resulting from the missing.

The echo signal level controller may replace the level of the echo signal resulting from the missing by any one of the levels of the adjacent echo signals in the azimuth direction.

The echo signal level controller may replace the level of the echo signal resulting from the missing by an average value of a plurality of levels of adjacent echo signals in the azimuth direction.

The echo signal level controller may linearly interpolate the level of the echo signal resulting from the missing, from a plurality of levels of adjacent echo signals in the azimuth direction.

According to another aspect of the invention, a radar apparatus is provided, which includes the signal processing device of any one of the other aspects and an antenna for revolving while discharging electromagnetic waves for every azimuth and receiving echo signals.

According to another aspect of the invention, a method of processing signals is provided, which includes inputting echo signals caused by electromagnetic waves discharged from an antenna and reflected on one or more target objects, detecting a level of each of the echo signals with reference to an azimuth and a distance to the antenna, detecting a level change between the echo signals from locations which are close to each other, the locations of the echo signals being such that the distances from the antenna are substantially the same but the azimuths are different, comparing the level change with a predetermined reference pattern and outputting a level change pattern, and determining a missing of a signal based on at least two of the level change patterns.

According to the echo signal processing device of the aspects of the present invention, measures against the missing can be achieved by signal processing, rather than by hardware.

BRIEF DESCRIPTION OF THE DRAWINGS

The present disclosure is illustrated by way of example and not by way of limitation in the figures of the accompanying drawings, in which the like reference numeral indicate like elements and in which.

DESCRIPTION OF EMBODIMENTS

Hereinafter, an embodiment of the invention is described in detail with reference to the accompanying drawings.

Figure 1A:
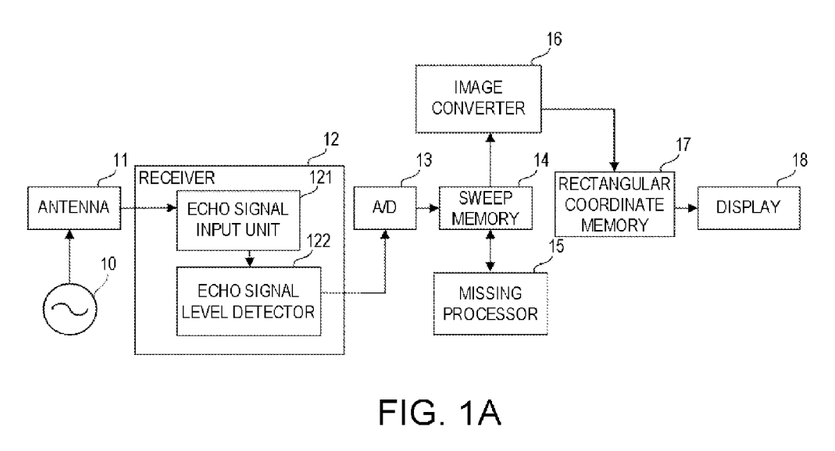
FIG. 1A is a block diagram showing a configuration of a radar device of an embodiment of the present invention.

FIG. 1A is a block diagram showing a configuration of a radar device that is built with a signal processing device of the claims therein. The radar device is installed in, for example, a ship (hereinafter, it may be referred to as "own ship" or may be simply referred to as "the ship"), and transmits and receives electromagnetic waves around own ship so as to detect a target object such as another ship.

In FIG. 1A, the radar device includes a magnetron 10, an antenna 11, a receiver 12, an A/D converter 13, a sweep memory 14, a missing processor 15, an image converter 16, a rectangular coordinate memory 17, and a display 18.

The radar device introduces an electromagnetic wave that is outputted from the magnetron 10 to the antenna 11 via a circulator (not illustrated), and discharges the electromagnetic wave in each azimuth around the ship. An echo signal is received by the antenna 11 and introduced to the receiver 12 via the circulator.

The receiver 12 includes, as its function, an echo signal input unit 121 and an echo signal level detector 122. The echo signal input unit 121 is inputted with an echo signal and outputs it to the echo signal level detector 122. The echo signal level detector 122 outputs to the A/D converter 13 a value corresponding to a level of the echo signal received by the antenna 11. The A/D converter 13 converts the inputted echo signal of an analog value into a digital value and outputs it to the sweep memory 14 as measurement data.

The sweep memory 14 stores the measurement data for one measurement cycle (for 360° around the ship). Each measurement data is stored as sample data (sweep data) associated with an azimuth and a distance in a polar coordinate system.

The image converter 16 is inputted with the sweep data from the sweep memory 14, converts it to be in association with a rectangular coordinate system having a position of the ship as its origin, and outputs it as a pixel intensity value of a gradation corresponding to the level of each sweep data. The pixel intensity value of the rectangular coordinate system is stored in the rectangular coordinate memory 17 as rectangular coordinate data.

Figure 5A:
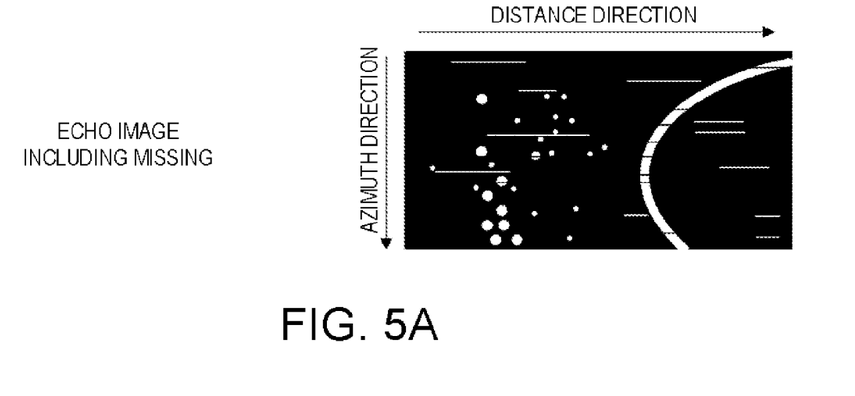
FIGS. 5A to 5C are views showing echo images.
Figure 5B:
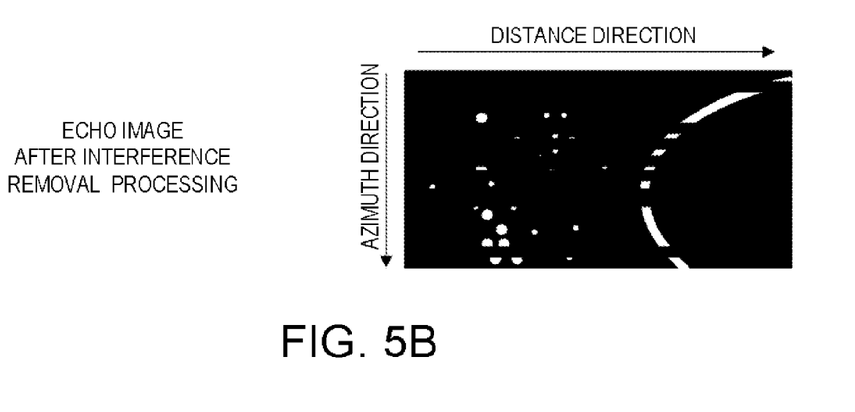
Figure 5C:
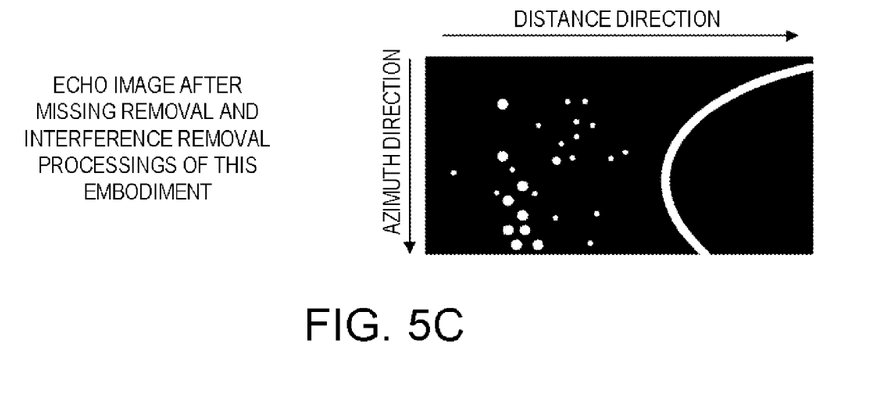

The display 18 reads out the rectangular coordinate data stored in the rectangular coordinate memory 17 and displays it as a radar image (echo image) as shown in FIGS. 5A to 5C. Note that, in this embodiment, an example where a background color is a dark color (e.g., black) and pixels with higher pixel intensity values are displayed in lighter colors in gray scale is described. Conversely, the background color may be a light color (e.g., white) and the pixels with higher pixel intensity values may be displayed in darker colors in the gray scale. Alternatively, they may be displayed as a color image.

With the magnetron 10, though rarely, a missing phenomenon in which the magnetron 10 fails to discharge a pulse with a desired energy occurs for some reason. In this case, the electromagnetic wave is not discharged or is discharged only at a low level, thereby, even if a target object exists in an azimuth toward which the electromagnetic wave is supposed to be discharged, a level of a reception signal is extremely low and only mainly a noise component is contained in the reception signal. Therefore, as a result, an echo image which is partially missing in a certain azimuth along the distance direction will be displayed.

Here, the radar device of this embodiment detects the missing and performs level control processing (interpolation) thereto by the missing processor 15, and updates contents of the sweep data in the sweep memory 14. As a result, in place of the data of the azimuth at which the missing occurred, the image converter 16 is inputted with sweep data that have been interpolated and an echo image thereof without any missing condition is displayed on the display 18.

Hereinafter, contents of the processing of the missing processor 15 is described in detail with reference to the flowchart in FIG. 11. First, the radar device discharges from the antenna 11 the electromagnetic wave outputted from the magnetron 10 (S11). Then the receiver 12 is inputted with the echo signal received by the antenna 11 (S12), and performs the level detection processing for outputting the value corresponding to the level of the echo signal (S13). The value corresponding to the level of the echo signal is converted into the digital value by the A/D converter 13 and is stored in the sweep memory 14. Moreover, the missing processor 15 performs the missing detection and the level control processing by operation modules shown in FIG. 1B.

Figure 1B:
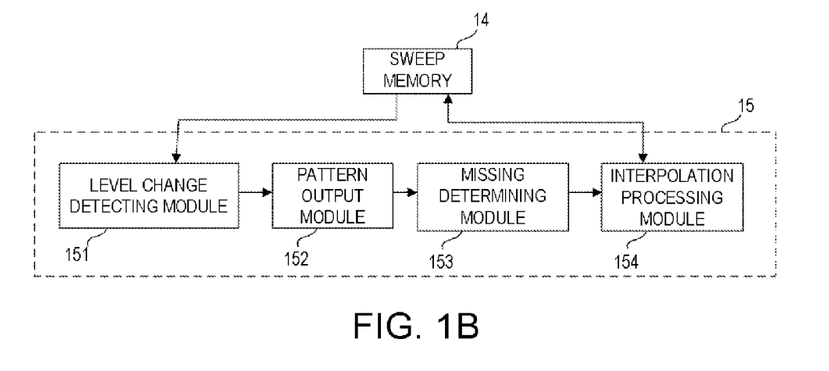
FIG. 1B is a block diagram showing a configuration of a missing processor shown in FIG. 1A.

FIG. 1B is a block diagram showing the configuration of the missing processor 15 shown in FIG. 1A. The missing processor 15 includes a level change detecting module 151, a pattern output module 152, a missing determining module 153, and an interpolation processing module 154. Through these operation modules, the missing processor 15 detects the missing within the sweep data and performs the level control processing.

The level change detecting module 151 reads out the sweep data from the sweep memory 14 and detects a level change between sweeps, for each distance (S14). When having a sample of a certain sweep as x(n) and a sample of the next sweep at the same distance as x(n+1), the level change detecting module 151 obtains a level difference between the sweeps, x(n+1)−x(n), for all the samples in the sweep memory 14.

The pattern output module 152 classifies the level change between the samples of the sweeps obtained by the level change detecting module 151 into one of a plurality of patterns (S15). FIGS. 2A to 2D are charts showing the patterns of each level change between the samples of the sweeps. As shown in FIGS. 2A to 2D, the pattern output module 152 classifies the level change between the sweeps into one of three patterns determined by the following formula (1).

if $x(n+1)-x(n)<$threshold$N$ then Pattern$N$ else if $x(n+1)-x(n)>$threshold$P$ then Pattern$P$ else Pattern$Z$ (1)

Figure 2A:
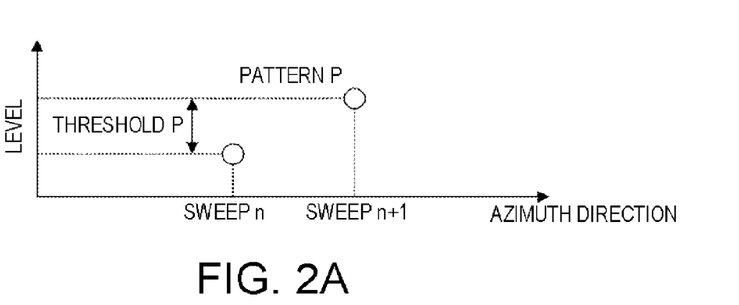
FIGS. 2A to 2D are charts showing patterns of a level change between samples of sweeps.

That is, as shown in FIG. 2A, the pattern output module 152 classifies the level change as a pattern P (positive change) when the level of the sample x(n+1) of the next sweep is higher than the level of the sample x(n) of the certain sweep by a predetermined value or above (when the level difference is larger than a predetermined threshold threshold P). Note that, "threshold P" in other figures indicates that the level difference between the samples of the sweeps is higher than the value threshold P.

Figure 2B:
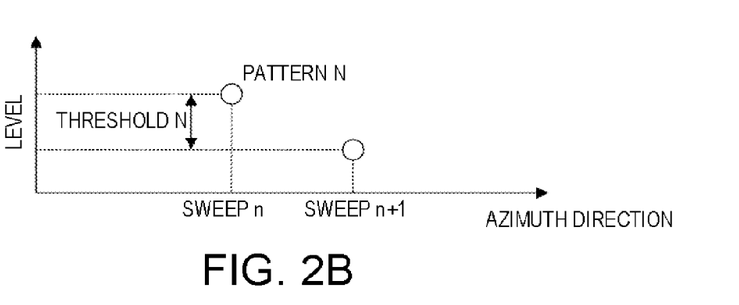
Figure 2C:
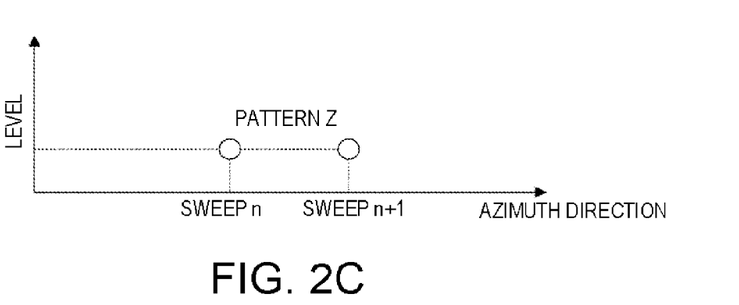
Figure 2D:
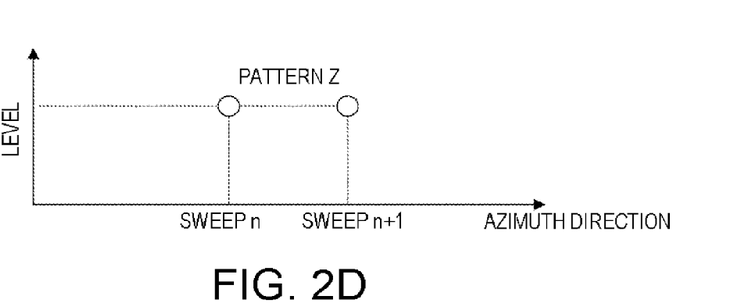

Further, as shown in FIG. 2B, the pattern output module 152 classifies the level change as a pattern N (negative change) when the level of the sweep data x(n+1) is lower than the level of the sweep data x(n) by a predetermined value or above (when the level difference is smaller than a predetermined threshold threshold N). Note that, "threshold N" in other figures indicates that the level difference between the samples of the sweeps is smaller than the value threshold N. As shown in FIGS. 2C and 2D, when the level change is neither applicable to the pattern N nor pattern P (i.e., when the level change between the data of the sweeps is small), it is considered as a pattern Z.

Figure 3A:
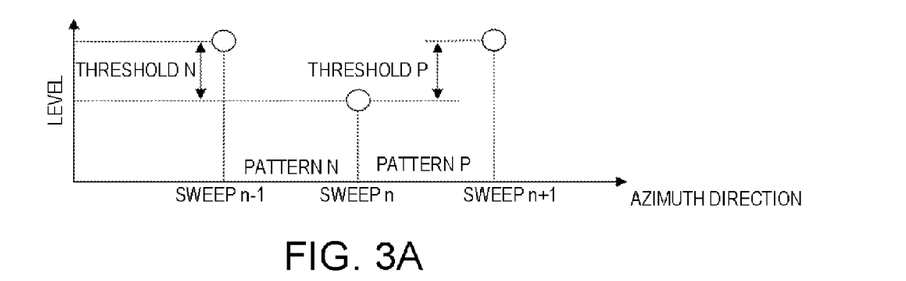
FIGS. 3A to 3C are charts showing patterns for determining a missing of a signal.
Figure 3B:
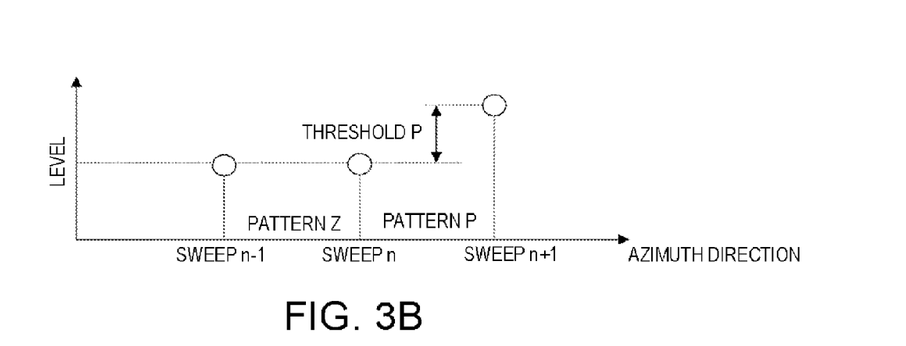
Figure 3C:
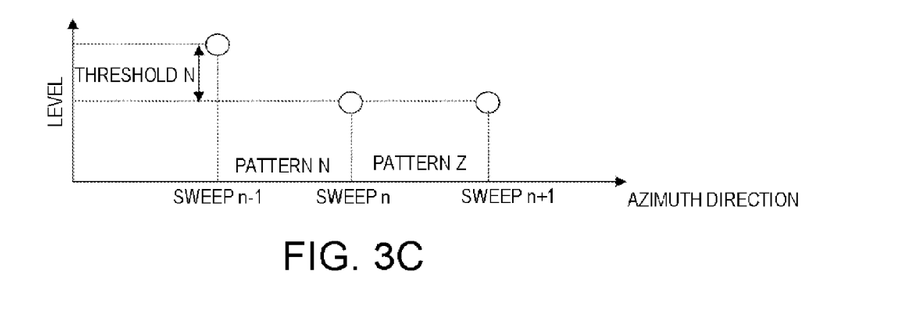

The missing determining module 153 performs the missing detection processing for each sample of the sweep data, based on the patterns classified by the pattern output module 152 (S16). FIGS. 3A to 3C are views showing the patterns for determining a missing. The missing determining module 153 determines the missing for the observing sweep data x(n) based on the level change patterns of a plurality of samples (here, three samples which contain the adjacent samples) consecutive in the azimuth direction. For example, as shown in FIG. 3A, when the level change pattern from the data x(n−1) to the data x(n) is the pattern N and the level change pattern from the data x(n) to the data x(n+1) is the pattern P, the missing determining module 153 determines that the missing has occurred in the observing sweep data x(n) (S17).

Missing has a characteristic in which data level sharply rises after sharply falling in the azimuth direction. Therefore, the missing determining module 153 can accurately extract only the missing by extracting the level change pattern peculiar to the missing component.

Alternatively, because the missing may continue on multiple azimuths, it may be determined as missing when, as shown in FIG. 3B, the level change pattern from the data x(n−1) to the data x(n) is the pattern Z and the level change pattern from the data (x) to the data x(n+1) is the pattern P, or when, as shown in FIG. 3C, the level change pattern from the data x(n−1) to the data x(n) is the pattern N and the level change pattern from the data x(n) to the data x(n+1) is the pattern Z. Note that, as an occurrence frequency of the missing is extremely low (below 0.1%), the determinations as shown in FIGS. 3B and 3C are not indispensable.

Figure 4A:
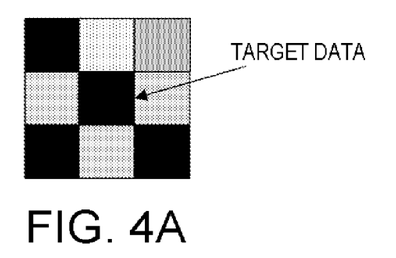
FIGS. 4A to 4D are views showing examples of level control processing.
Figure 4B:
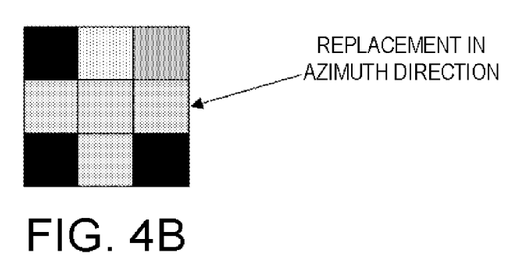
Figure 4C:
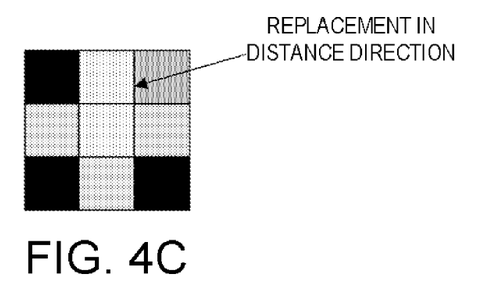
Figure 4D:
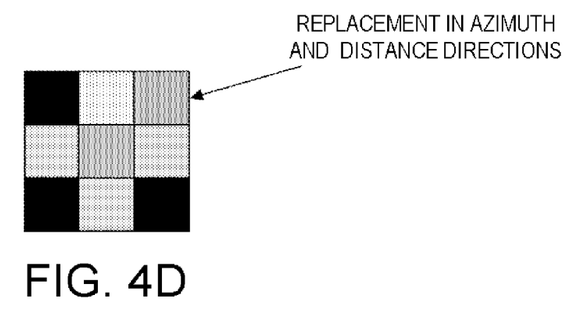
Figure 11:
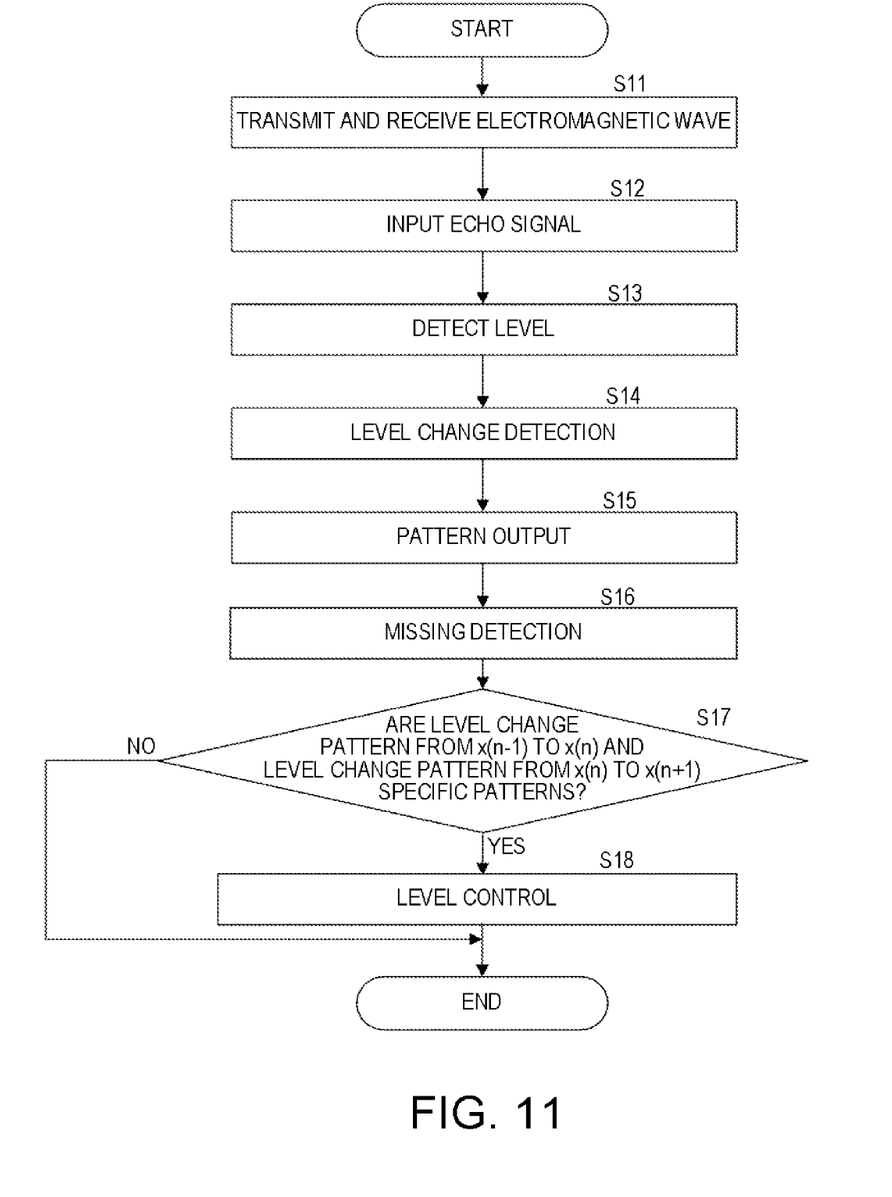
FIG. 11 is a flowchart showing an operation of the radar device.

As indicated at S18 in FIG. 11, the interpolation processing module 154 (corresponding to the "echo signal level controller" of the claims) performs the level control processing of the sweep data determined as missing by the missing determining module 153. FIG. 4A is a view showing each of the samples before the level control processing as an echo image. In the level control processing, for example, as shown in FIG. 4B, the interpolation processing module 154 replaces the target data with one of the adjacent data in the azimuth direction. In this case, it may be replaced by an average value of the adjacent data in the azimuth direction. Alternatively, as shown in FIG. 4C, the interpolation processing module 154 may replace the target data with data next to the target data in the distance direction. In this case, it may also be replaced by an average value of the adjacent data in the distance direction. Further, as shown in FIG. 4D, the interpolation processing module 154 may replace the target data by one of the adjacent data in both the azimuth and the distance directions. In this case, it may also be replaced by an average value of a plurality of data (e.g., four data).

By the above described processing, the interpolation processing module 154 performs the interpolation processing of the data where the missing has occurred and updates the sweep data. As shown in the image FIG. 5A (simulation image), when the missing occurs, an image in which an echo image is partially lacking in a certain azimuth along the distance direction is displayed and a display quality is degraded. Further, there is a case where the echo signal received by the antenna 11 contains an electromagnetic wave discharged from, for example, another ship as an interference component, other than the electromagnetic wave reflected by the target object. For removing such an interference component, there is a method of, for example, adopting a minimum value of a plurality of data (e.g., sequential five samples before and after the observing sample including the observing sample) in the azimuth direction. However, by performing such interference removal processing, as shown in FIG. 5B, the missing portion is extended and the echo signal may even be removed.

Meanwhile, as the radar device of this embodiment detects the portion of the level change that sharply rises after sharply falling in the azimuth direction as the missing, and performs the interference removal processing after the interpolation processing, as shown in FIG. 5C, only the missing and interference portions are accurately extracted and there is a lower possibility that the echo signal from the target object is removed.

Alternatively, the interference and missing removal processings may be performed at the same time or sequentially. If the missing removal processing is performed first, a possibility of having the missing stretched in the azimuth direction as described above is reduced. If the interference removal processing is performed first, as described below, a possibility of having a false determination between the missing and the interference is reduced.

That is, in the above method of determining the missing, when the data adjacent to the observing sample is interference, that is in the azimuth direction when the pattern (1) an interference sweep, a normal sweep (with low level), and an interference sweep occurs, the data may be falsely determined as the missing. In addition, when the data adjacent to the observing sample is the missing, that is in the azimuth direction when the pattern (2) a missing sweep, a normal sweep (with high level), and a missing sweep occurs, the data may be falsely determined as interference. Note that, because the occurrence frequency of the missing is extremely low as described above, the case (2) hardly occurs. Therefore, if performing the interference removal processing first and determining the missing after the interference is removed, the case (1) hardly occurs as well and the false determination between the interference and the missing hardly occurs.

Figure 6A:
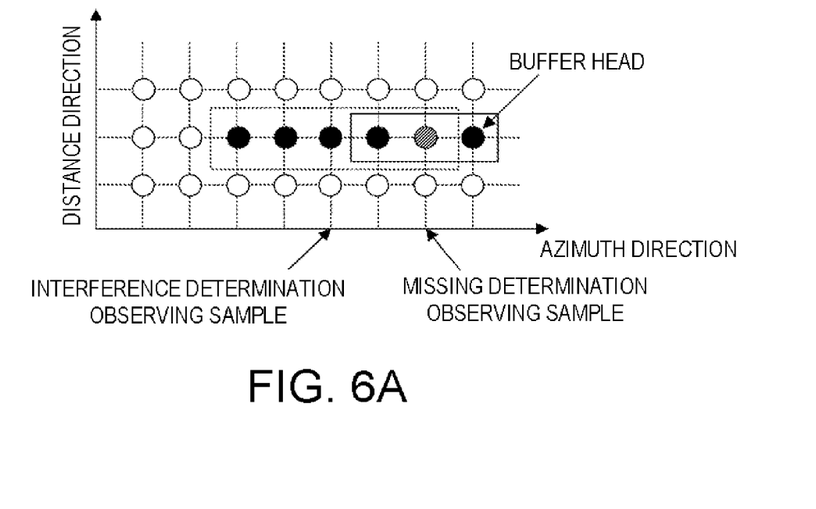
FIGS. 6A and 6B are exemplary views of buffered data in a case where a missing removal and an interference removal are performed.
Figure 6B:
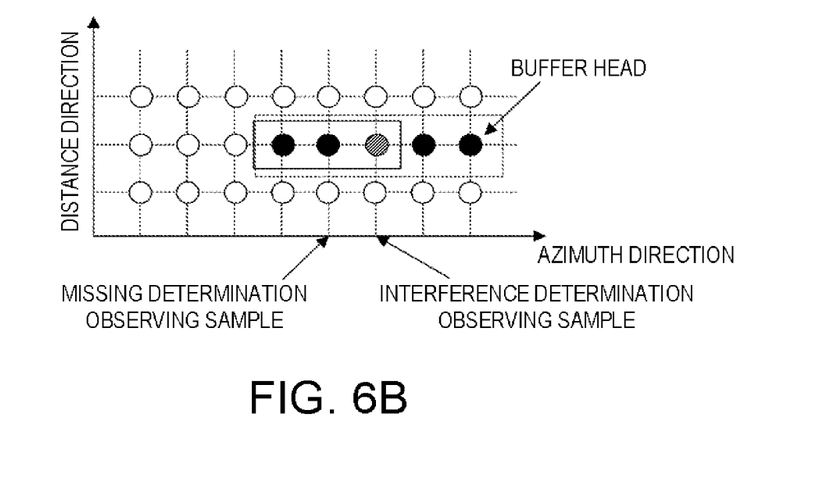

If the missing and interference removal processings are performed sequentially, as described below, a buffer size of the sweep data can be reduced. FIGS. 6A and 6B are exemplary views of buffered data in a case where the missing and interference removals are performed.

Normally, in the case of sequentially performing the missing and interference removals, samples for the processings need to be buffered in advance, respectively (e.g., three samples for the missing determination and removal processings, and five samples for the interference determination and removal processings). However, as shown in FIG. 6A, when performing the interference determination and removal processings after the missing removal processing, the data after the missing removal processing is to be inputted in the interference determination and removal processings, therefore, the interference determination and removal processing can be performed with five samples from the observing sample (hatched circle sample in FIG. 6A) in the missing removal processing, that is five samples starting from the second sample from the head of the buffer. Therefore, the total number of the required samples becomes six, in other words, only one additional sample is required to be obtained on top of the samples required for the interference removal processing.

Alternatively, as shown in FIG. 6B, the buffer size can also be reduced when performing the missing determination and removal processing after the interference removal processing. In this exemplary case, five samples are required for the interference removal processing and three samples are required for the missing removal processing, therefore, no additional sample is to be obtained on top of the samples required for the interference removal processing.

Note that, similar to the missing determination processing of this embodiment, interference can also be detected based on level changes among a plurality of sweep data in the azimuth direction. For example, when the level change pattern between the observing sweep data $x(n)$ and the sweep data $x(n-1)$ of one sweep before is the pattern P and the change pattern between the sweep data $x(n)$ and the next sweep data $x(n+1)$ is the pattern N, it is determined as interference.

Note that, the number of the sweep data for the missing determination is not limited to three and may be four or above. For example, as shown in FIGS. 7A to 7E and 8A to 8D, five consecutive sweep data in the azimuth direction may be used to perform the missing determination. First, level change patterns for determining the missing by using the five sweep data is described in detail with reference to FIGS. 7A to 7E.

Figure 7A:
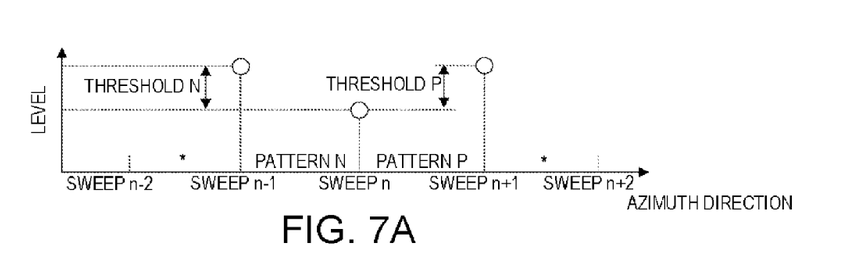
FIGS. 7A to 7E are views showing change patterns when performing a missing determination using five consecutive sweep data in the azimuth direction.
Figure 7B:
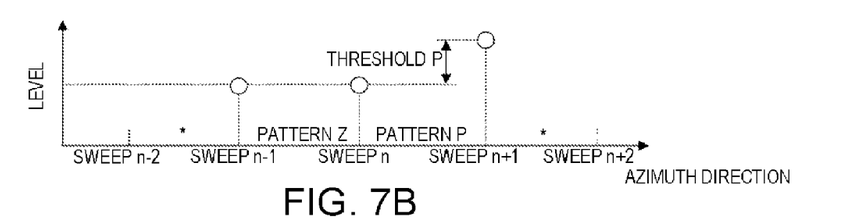
Figure 7C:
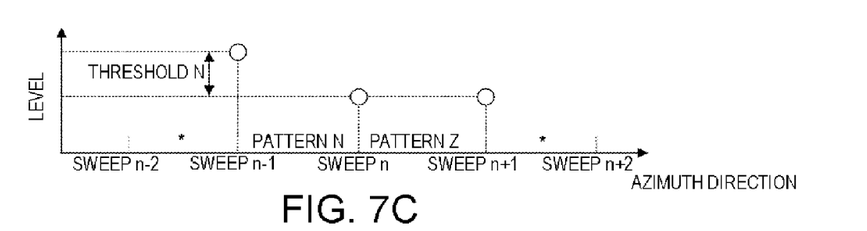

As shown in FIG. 7A, when the level change from the data of the sweep of one sweep before to the data of the observing sweep is the pattern N and the level change pattern from the data of the observing sweep to the data of the next sweep is the pattern P, regardless of the level changes of other portions (from data of a sweep n−2 to the data of the sweep n−1, and from the data of the sweep n+1 to data of a sweep n+2), the missing determining module 153 determines the missing in an approach similar to the case using three sweep data. Similarly, as shown in FIG. 7B, when the level change from the data of the sweep of one sweep before to the data of the observing sweep is the pattern Z and the level change from the data of the observing sweep to the data of the next sweep is the pattern P, regardless of the level changes of other portions, the missing determining module 153 determines the missing in an approach similar to the case using the three sweep data. Further, as shown in FIG. 7C, when the level change from the data of the sweep of one sweep before to the data of the observing sweep is the pattern N and the level change from the data of the observing sweep to the data of the next sweep is the pattern Z, regardless of the level changes of other portions, the missing determining module 153 determines the missing in an approach similar to the case using the three sweep data.

Figure 7D:
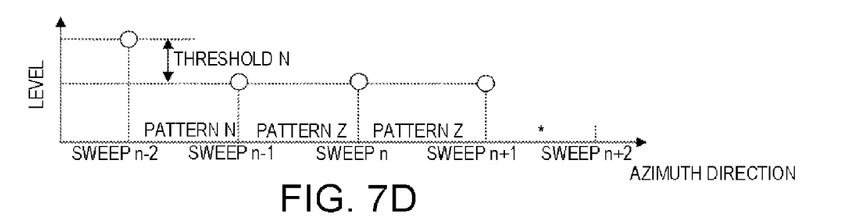
Figure 7E:
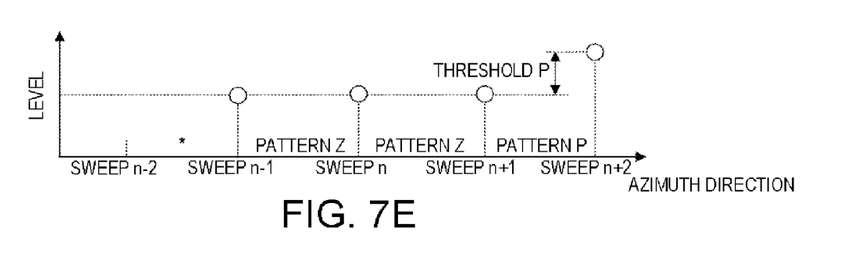

Further, as shown in FIG. 7D, the missing determining module 153 also determines the missing when the level change patterns from the data of the sweep of one sweep before to the data of the observing sweep and from the data of the observing sweep to the data of the next sweep are both the pattern Z and the level change pattern from the sweep data $x(n-2)$ to the sweep data $x(n-1)$ is the pattern N. Similarly, as shown in FIG. 7E, the missing determining module 153 also determines the missing when the change patterns from the data of the sweep of one sweep before to the data of the observing sweep and from the data of the observing sweep to the data of the next sweep are both the pattern Z and the change pattern from the sweep data $x(n+1)$ to the sweep data $x(n+2)$ is the pattern P. Thereby, the missing in which the data having comparable levels are consecutive in the azimuth direction can also be detected.

Figure 8A:
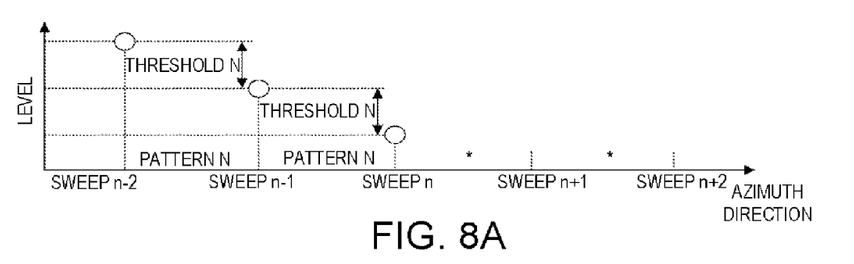
FIGS. 8A to 8D are views showing change patterns when performing a missing determination using five consecutive sweep data in an azimuth direction.
Figure 8B:
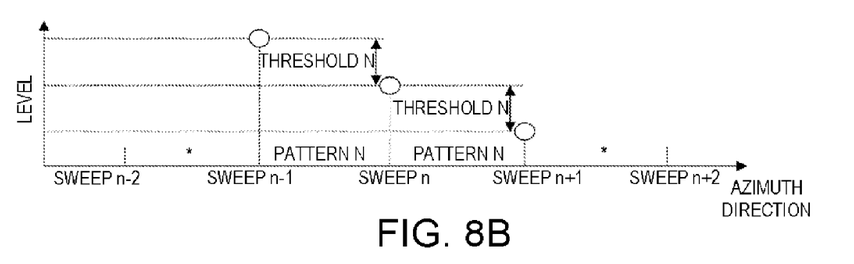
Figure 8C:
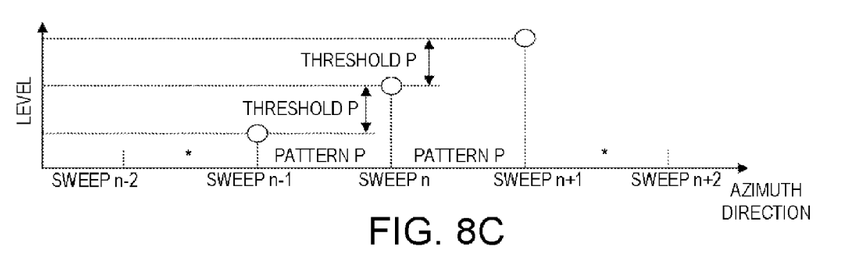
Figure 8D:
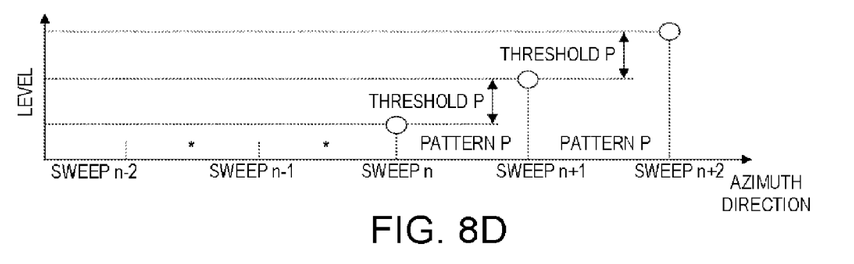

Furthermore, the missing determining module 153 may determine the missing when the level change pattern is the pattern P or the pattern N consecutively in the azimuth direction in an approach as follows. That is, the missing determining module 153 determines the missing when, as shown in FIG. 8A, the level change pattern from the sweep data $x(n-2)$ to the sweep data $x(n-1)$ is the pattern N and the level change pattern from the sweep data $x(n-1)$ to the sweep data $x(n)$ is the pattern N, or when, as shown in FIG. 8B, the level change pattern from the sweep data $x(n-1)$ to the sweep data $x(n)$ is the pattern N and the level change pattern from the sweep data $x(n)$ to the sweep data $x(n+1)$ is the pattern N. Further, the missing determining module 153 determines the missing when, as shown in FIG. 8C, the level change pattern from the sweep data $x(n-1)$ to the sweep data $x(n)$ is the pattern P and the change pattern from the sweep data $x(n)$ to the sweep data $x(n+1)$ is the pattern P, or when, as shown in FIG. 8D, the change pattern from the sweep data $x(n)$ to the sweep data $x(n+1)$ is the pattern P and the change pattern from the sweep data $x(n+1)$ to the sweep data $x(n+2)$ is the pattern P. In these cases, the missing in which the signal has different levels in the azimuth direction can be detected.

Note that, the missing determination based on the three sweep data and the determination based on the five sweep data may be switched according to the occurrence frequency of the missing. For example, a determination is normally performed using the five sweep data, and, when a plurality of samples in the azimuth direction are continuously determined to be the missing, it is switched to the determination based on the three sweep data.

Here, in the above embodiment, although only the level changes in the azimuth direction are taken into consideration, the determination may be performed by taking the level changes in a distance direction into consideration. In this case, a change pattern is calculated, for example, using a sample averaged in the distance direction, as the following formula (2).

$$\text{if} \quad \frac{1}{W}\sum_{r}^{W}\{x(n+1)-x(n)\} < thresholdN \text{ then } PatternN$$
$$\text{else if} \quad \frac{1}{W}\sum_{r}^{W}\{x(n+1)-x(n)\} > thresholdP \text{ then } PatternP$$
$$\text{else} \quad PatternZ$$
(2)

In many cases, the missing has low level signals over a plurality of samples in the distance direction, in addition to having the characteristic in which the signal level sharply rises after sharply falling in the azimuth direction. Therefore, the level change detecting module 151 averages the level changes among the samples by using the signal in the distance direction, and the pattern output module 152 classifies the averaged level change into one of a plurality of patterns. As in formula (2), by calculating the change patterns using the sample obtained by averaging a plurality of samples in the distance direction, falsely detecting as the missing a low level signal that occurs briefly in the distance direction can be prevented.

Figure 9A:
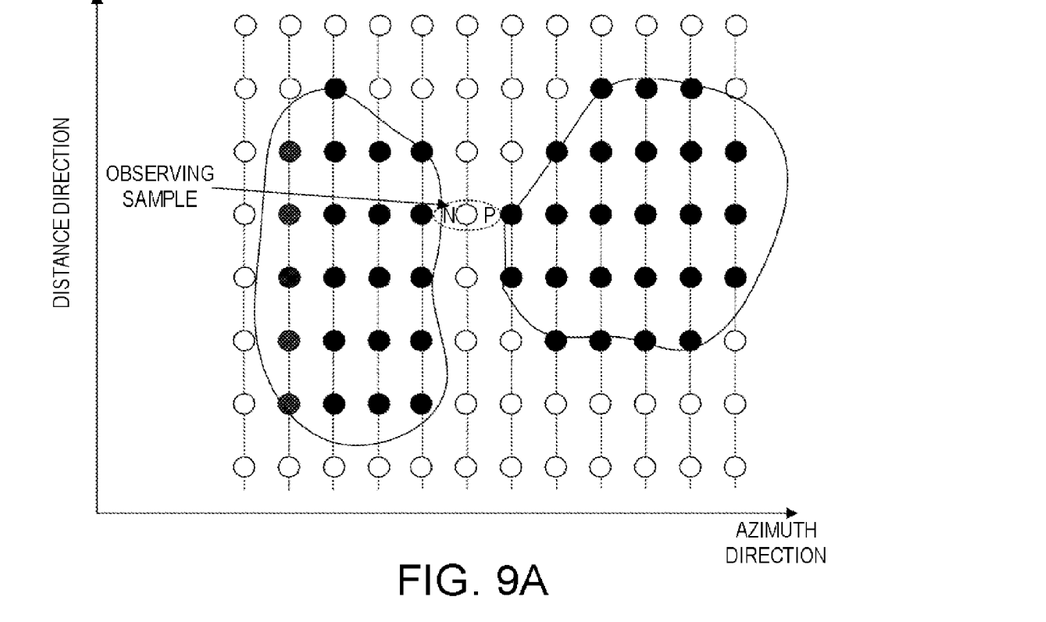
FIGS. 9A and 9B are views showing classifications of change patterns by taking samples in a distance direction into consideration.
Figure 9B:
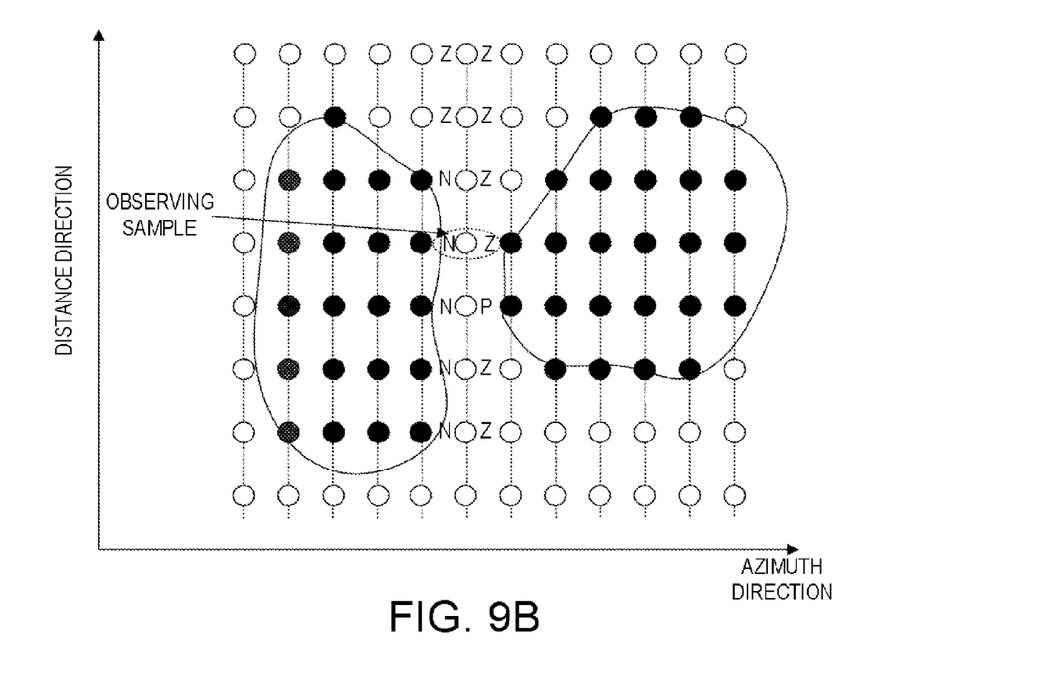

Moreover, with reference to a plurality of level change patterns (e.g., six adjacent patterns) in the azimuth direction for each sample, the pattern output module 152 classifies the most frequent level change pattern as the change pattern for the azimuth direction. For example, as shown in FIG. 9A, for a certain observing sample, even if a level change pattern from a sample of a sweep of one sweep before to the observing sample is the pattern N and a level change pattern from a sample of a sweep of one sweep after to the observing sample is the pattern P, as shown in FIG. 9B, the pattern output module 152 replaces the change from the pattern N to the pattern P by the most frequent change pattern (change from the pattern N to the pattern Z) among the six adjacent patterns in the azimuth direction. As a result, the observing sample which is to be falsely determined as the missing (the change from the pattern N to the pattern P) when using only the determination in the azimuth direction can be determined that it is not the missing.

Figure 10:
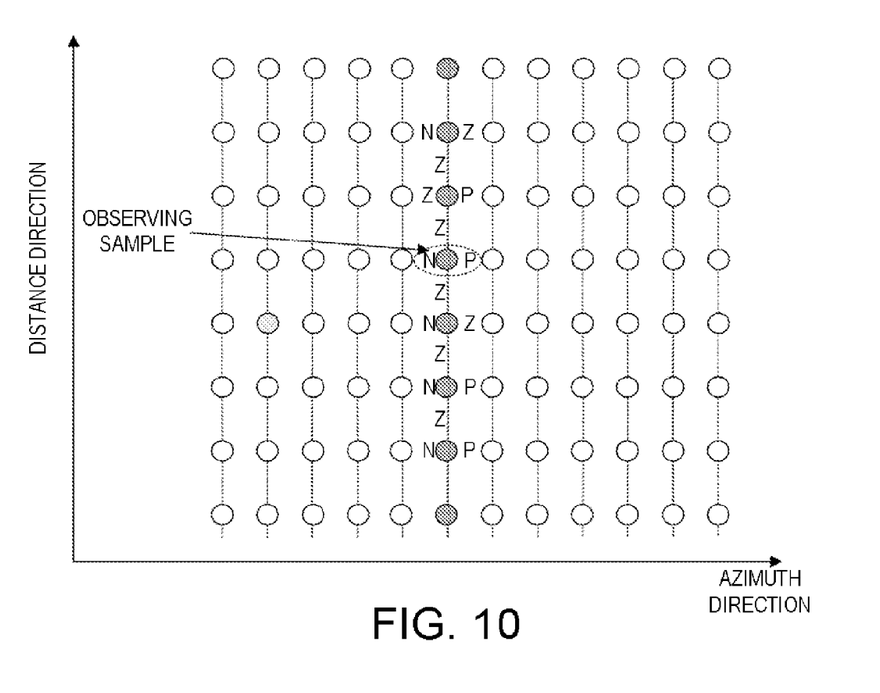
FIG. 10 is a view showing classifications of change patterns by taking samples in a distance direction into consideration.

Further, the missing determination may be performed by taking a level change in a distance direction into consideration, as shown in FIG. 10. Here, the level change detecting module 151 detects a level change between samples adjacent to each other in the azimuth direction. The pattern output module 152 classifies the level changes in the azimuth direction into a plurality of patterns (patterns P, N and Z). Further, the level change detecting module 151 also detects level changes between samples adjacent to each other in the distance direction, for each of the samples in the azimuth direction. Further, the pattern output module 152 classifies the level changes in the distance direction into a plurality of patterns (patterns P, N and Z).

Furthermore, a determination of level changes in the distance direction may be performed in addition to the determination of the level changes in the azimuth direction. For example, a sample for which the level change patterns in the azimuth direction change from the pattern N to the pattern P, the pattern N to the pattern Z, or the pattern Z to the pattern P, and the level change patterns in the distance direction go from the pattern Z to the pattern Z is determined as missing.

Alternatively, without limiting the number of the observing sample to only one, a plurality of samples in the azimuth and distance directions may be used as observing samples and the determination of the missing may be performed based on a two-dimensional level change pattern. In this case, the determination of the missing is performed by storing the two-dimensional level change pattern (reference) which is to be determined as the missing in a memory (not illustrated) in advance and comparing the observing samples with the reference. Here, fuzzy inference or neural network may be used for the pattern matching techniques.

Note that, in this embodiment, the thresholds (threshold P and threshold N) of the level changes are fixed values. However, they may adaptively be changed. For example, when a gain of an echo signal is changed between sweeps, the threshold may be changed corresponding to the difference of the gains between the sweeps (i.e., the threshold corresponding to the gain ratio).

Further, as described above, the level changes of the data adjacent to each other in the azimuth direction and/or the distance direction are detected, but alternatively, for example, level changes between data taken from every other sweep may be detected.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about"

or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A signal processing device, comprising:
   an echo signal input unit for being inputted with echo signals caused by electromagnetic waves discharged from an antenna and reflected on one or more target objects;
   an echo signal level detector for detecting a level of each of the echo signals with reference to an azimuth and a distance to the antenna;
   a level change detector for detecting a level change between the echo signals from locations close to each other, the locations of the echo signals being such that the distances from the antenna are substantially the same but the azimuths are different;
   a pattern output module for comparing the level change with a predetermined reference pattern and outputting a level change pattern; and
   a missing determining module for determining a missing of a signal based on at least two of the level change patterns.

2. The signal processing device of claim 1, wherein the locations corresponding to the echo signals used for outputting the at least two level change patterns are adjacent to each other.

3. The signal processing device of claim 1, wherein the pattern output module classifies the level change into a first pattern if the level change is less than a first threshold, into a second pattern if the level change exceeds a second threshold, and into a third pattern if the level change applies to neither the first pattern nor the second pattern.

4. The signal processing device of claim 3, wherein the missing determining module determines the missing when the pattern of the level change changes from the first pattern to the second pattern.

5. The signal processing device of claim 3, wherein the missing determining module determines the missing when the pattern of the level change changes from the first pattern to the third pattern.

6. The signal processing device of claim 3, wherein the missing determining module determines the missing when the pattern of the level change changes from the third pattern to the second pattern.

7. The signal processing device of claim 1, wherein the level change corresponds to a difference value of the levels of the echo signals adjacent to each other in the azimuth direction.

8. The signal processing device of claim 3, wherein the missing determining module determines the missing in a case where a group of at least two consecutive third patterns follows the first pattern.

9. The signal processing device of claim 3, wherein the missing determining module determines the missing in a case where the second pattern follows a group of at least two consecutive third patterns.

10. The signal processing device of claim 3, wherein the missing determining module determines the missing in a case where at least two first patterns appear consecutively.

11. The signal processing device of claim 3, wherein the missing determining module determines the missing in a case where at least two second patterns appear consecutively.

12. The signal processing device of claim 1, wherein the level change detector averages the level changes in the distance direction, and
   wherein the pattern output module uses the averaged level change for the comparison.

13. The signal processing device of claim 1, wherein the level change detector further detects a level change between the echo signals from locations which are close to each other, the locations of the echo signals being such that the azimuths from the antenna are substantially the same but the distances from the antenna are different, and
   wherein the pattern output module outputs the most frequent level change pattern within a predetermined distance range as the level change pattern for every azimuth and distance.

14. The signal processing device of claim 1, wherein the level change detector further detects a level change between the echo signals from locations which are close to each other, the locations of the echo signals being such that the azimuths from the antenna are substantially the same but the distances from the antenna are different, and
   wherein the missing determining module determines the missing further based on a plurality of level change patterns adjacent to each other in the distance direction.

15. The signal processing device of claim 1, further comprising an echo signal level controller for controlling the level of the echo signal resulting from the missing.

16. The signal processing device of claim 15, wherein the echo signal level controller replaces the level of the echo signal resulting from the missing by any one of the levels of the adjacent echo signals in the azimuth direction.

17. The signal processing device of claim 15, wherein the echo signal level controller replaces the level of the echo signal resulting from the missing by an average value of a plurality of levels of adjacent echo signals in the azimuth direction.

18. The signal processing device of claim 15, wherein the echo signal level controller linearly interpolates the level of the echo signal resulting from the missing, from a plurality of levels of adjacent echo signals in the azimuth direction.

19. A radar apparatus, comprising:
   the signal processing device of claim 1; and
   an antenna for revolving while discharging electromagnetic waves for every azimuth and receiving echo signals.

20. A method of processing signals, comprising:
   inputting echo signals caused by electromagnetic waves discharged from an antenna and reflected on one or more target objects;
   detecting a level of each of the echo signals with reference to an azimuth and a distance to the antenna;
   detecting a level change between the echo signals from locations which are close to each other, the locations of the echo signals being such that the distances from the antenna are substantially the same but the azimuths are different;
   comparing the level change with a predetermined reference pattern and outputting a level change pattern; and
   determining a missing of a signal based on at least two of the level change patterns.

* * * * *